United States Patent [19]
Smalley et al.

[11] 3,995,010
[45] Nov. 30, 1976

[54] PURIFICATION PROCESS

[75] Inventors: Edmund W. Smalley, Brewerton; Bruce Edward Kurtz, Marcellus, both of N.Y.

[73] Assignee: Allied Chemical Corporation, Morris Township, N.J.

[22] Filed: June 13, 1975

[21] Appl. No.: 586,762

[52] U.S. Cl. .............................. 423/240; 260/658 R
[51] Int. Cl.² .......................................... B01D 53/34
[58] Field of Search ........... 423/210, 240, 241, 245; 55/71; 260/658 R

[56] References Cited
UNITED STATES PATENTS 2,714,121 7/1955 Anderson et al. ............ 260/658 R X
3,826,816 7/1974 McCormick ........................ 423/240

FOREIGN PATENTS OR APPLICATIONS 645,603 7/1962 Canada ........................... 260/658 R

*Primary Examiner*—Earl C. Thomas
*Attorney, Agent, or Firm*—Anthony J. Stewart; Jack B. Murray, Jr.

[57] ABSTRACT

A process is provided for removing vinyl chloride from gaseous streams containing the same wherein the gaseous vinyl chloride stream is contacted with a hypochlorous acid solution for substantially complete absorption and reaction of the vinyl chloride, thereby minimizing the hazards associated with passage of vinyl chloride monomer to the atmosphere.

9 Claims, 2 Drawing Figures

PURIFICATION PROCESS

BACKGROUND OF THE INVENTION

1. Field of the Invention

This invention relates to the purification of gas streams and more specifically to the removal of vinyl chloride from a gaseous stream containing the same.

2. Description of the Prior Art

In industrial processes, it is desired to remove vinyl chloride gases from gas streams passed to the atmosphere. Due to the health hazards associated with this gas which have recently become known and due to regulatory activity on the subject of vinyl chloride (i.e., VCM) by a number of governmental regulatory agencies, there exists a need to remove vinyl chloride more completely from such gas streams. For example, the Occupational Safety and Health Administration has established an exposure limit of 1 ppm vinyl chloride monomer averaged over any 8 hours period; and a ceiling of 5 ppm vinyl chloride monomer averaged over any period not exceeding 15 minutes. Moreover, it is anticipated that the Environmental Protection Agency will also issue a regulation dealing with the emissions of vinyl chloride.

The presence of vinyl chloride in the atmosphere is, therefore, of major concern both to manufacturers of vinyl chloride monomer and to those manufacturers who convert the vinyl chloride monomer into polyvinyl chloride, a mainstay in the plastics industry. Vinyl chloride concentrations in vent gas streams as much as several hundred parts per million in large volumes of air flows may be expected to result from commercial processes, generally continuously operated, for production of vinyl chloride monomer. In addition, the normally batchwise process which is commercially employed to produce polyvinyl chloride will typically result in still larger flows of gases containing vinyl chloride. Thus, depending on the nature of operations at a given facility, the volumetric flow rate of vent streams containing vinyl chloride may range up to about 100,000 standard cubic feet of gases per minute. A process for removing vinyl chloride from gases over such a wide range of flow rates is therefore required.

While absorption of vinyl chloride by solids, such as charcoal, silica gel or molecular sieves may be employed to remove vinyl chloride gas from such vent streams, the high pressure drop associated with beds of solid particles is a serious disadvantage when handling large volumes of air and the loading and unloading of such beds is very awkward. Vapor phase reactions usually require use of high temperatures, a catalyst and/or photoinduction to cause vinyl chloride reactions to proceed, and such conditions are not favorable to removal of low vinyl chloride concentrations. Also, absorption of vinyl chloride in organic solvents such as mineral oil, alcohols or chlorinated solvents is disadvantageous due to the solvent's substantial vapor pressure which results in solvent vapors which must be recovered to prevent its passage to the atmosphere as an added pollutant. Thus, it would be desirable to employ an aqueous absorption system.

There have previously been developed processes wherein gas containing high concentrations of vinyl chloride are passed to an aqueous medium for reaction of the vinyl chloride to form chloroacetaldehyde. See, for example, U.S. Pat. No. 1,806,285 (issued in 1931 to Ernst et al.) and U.S. Pat. No. 2,060,303 (issued in 1936 to Groll et al.). See also British Pat. No. 299,722 and British Pat. No. 299,319. However, none of the foregoing processes effectively removes very low concentrations of vinyl chloride monomer from gases. Moreover, chloroacetaldehyde is also a severe health hazard and is a suspected carcinogen. Thus, conversion of vinyl chloride to chloroacetaldehyde only raises additional pollution problems.

SUMMARY OF THE INVENTION

According to the process of the present invention, substantially complete removal of vinyl chloride from a gaseous stream containing the same is effected by passing the gas containing vinyl chloride to a reaction zone wherein the stream is contacted with an aqueous medium containing hypochlorous acid, thereby producing a treated gas stream substantially free of said vinyl chloride.

Spent hypochlorous acid solution may be withdrawn from the reaction zone and passed to a chlorine treatment zone wherein the spent solution may be contacted with a chlorine-containing gas for absorption of chlorine and the consequent production of additional hypochlorous acid values. The aqueous hypochlorous acid solution thereby produced may then be recycled to the reaction zone. The vent gas stream substantially free of vinyl chloride may be passed to a stripping zone wherein the gas is contacted with an aqueous medium containing an alkaline reacting agent for removal of reaction products, such as 1,1,2-trichloroethane, which may remain in the vent gas stream following treatment in the reaction zone of the vinyl chloride gas.

The present invention has been found to advantageously effect substantially complete removal of vinyl chloride from gaseous streams containing the same, even when the gas streams sought to be treated contain relatively small initial concentrations of vinyl chloride. Moreover, the process is adapted to removing substantially all vinyl chloride from the large volumes of gas which are formed, as for example, both in the manufacture of vinyl chloride and polyvinyl chloride. Further, the product which is formed does not raise the pollution problems suggested by prior art processes wherein vinyl chloride is converted to chloroacetalhyde.

DETAILED DESCRIPTION OF THE INVENTION

Figure 1:
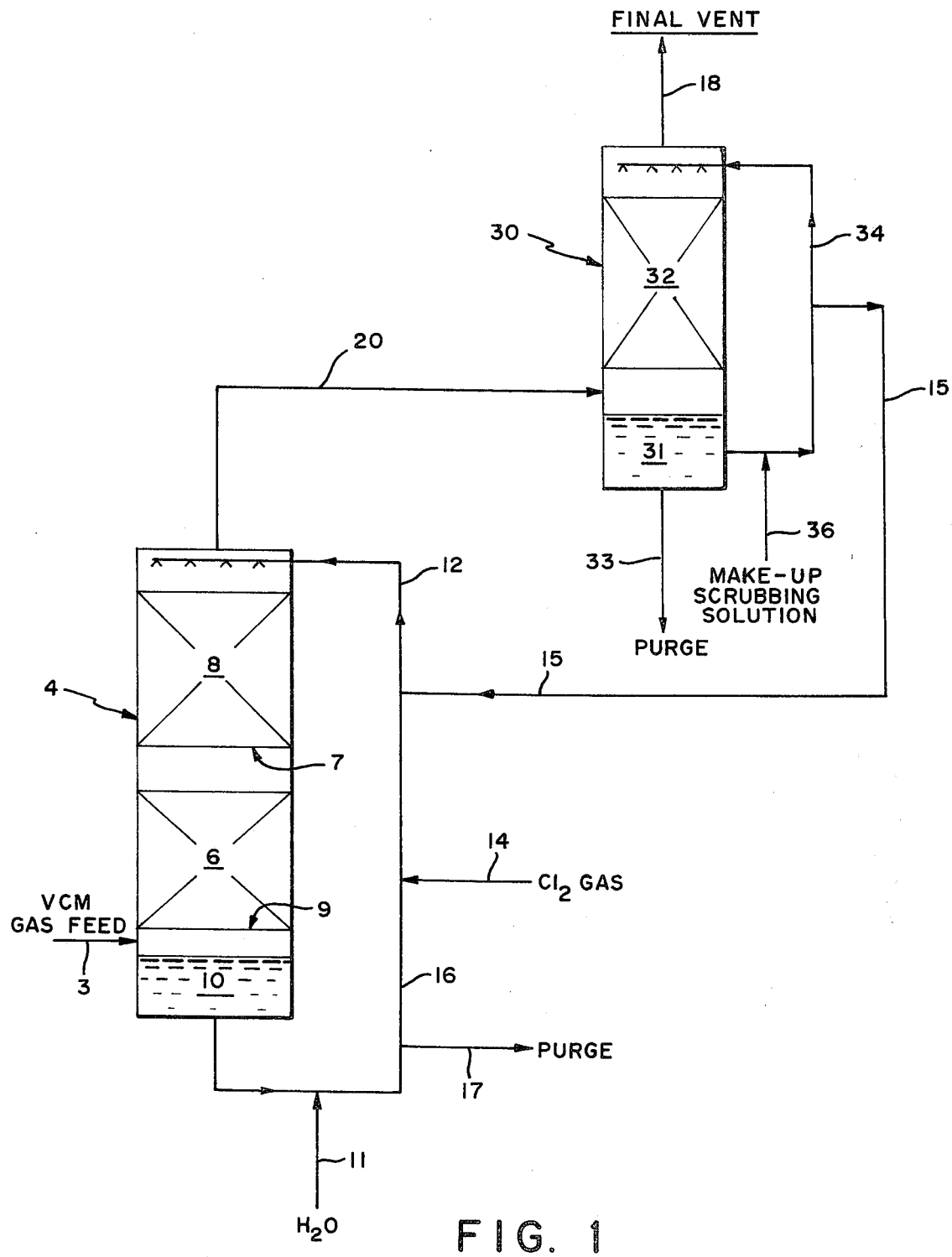
FIG. 1 is a diagrammatic illustration of a preferred embodiment of the process of the present invention.

In accordance with of the process of the present invention, a gas stream containing vinyl chloride is passed to a reaction zone wherein the gas stream is contacted with an aqueous medium containing hypochlorous acid. The vinyl chloride is absorbed by the aqueous medium, and the solvated species reacts with the hypochlorous acid, thereby producing a treated gas stream substantially free of vinyl chloride. The reaction between the hypochlorous acid and vinyl chloride values absorbed by the aqueous medium has been found to proceed by an addition reaction resulting in the formation of 1,1,2-trichloroethane. The reaction between hypochlorous acid and vinyl chloride may be illustrated by the following equation:

$$CH_2=CHCl + 2HOCl \rightarrow CH_2ClCH_2Cl_2 + H_2O$$

The concentration of vinyl chloride monomer in the gaseous streams sought to be treated by the instant process may vary widely, but is generally from about 0.0001 to about 10 volume percent, and preferably from about 0.01 to about 10 volume percent of the gas stream. While concentrations of vinyl chloride greater than about 10 volume percent may be treated by the instant process to remove vinyl chloride, such vinyl chloride concentrations are not generally encountered in industrial by-product or waste gas streams. Concentrations of less than about 0.0001 volume percent vinyl chloride in large volume gas streams would require prohibitively large absorbing liquid-to-gaseous vinyl chloride flow rate ratios.

The gaseous stream containing vinyl chloride may be obtained from a variety of sources. While the process of the present invention is particularly adapted to removal of vinyl chloride from by-product gaseous streams obtained in the production of vinyl chloride, as for example by the well-known process of thermal cracking of ethylene dichloride, the process of the present invention may also be employed for removing vinyl chloride from gaseous streams obtained during the processing of vinyl chloride to produce polyvinyl chloride, as well as other industrial sources of such gas streams, for example as by-product in the manufacture of chlorinated solvents.

The gas containing vinyl chloride may be contacted with the aqueous medium containing the hypochlorous acid either batch-wise, semi-continuously or continuously, and is preferably contacted as by counter-current or cocurrent absorption in a packed tower. Alternatively, the gas containing vinyl chloride may be contacted as by sparging the gas into a liquid absorption medium containing the hypochlorous acid. When a packed tower is employed, the vinyl chloride gas may be introduced to the tower in the vapor space below the packed section of the tower. Alternatively, the gas may be introduced to the tower at a point below the liquid level in the tower.

The aqueous hypochlorous acid solution fed to the reaction zone may contain hypochlorous acid in a wide variety of concentrations, the particular concentration chosen depending upon a variety of factors such as the concentration of vinyl chloride in the gaseous stream to be treated, the flow rate of the gas stream to be treated, the volume of the liquid absorption medium and the acidity of the absorption medium. However, hypochlorous acid will generally be contained in the liquid absorbing medium fed to the reaction zone in an amount of from about 0.004 to about 0.8 weight percent, and preferably from about 0.007 to 0.4 weight percent, of the liquid medium.

For most effective operation it has been found that the concentration of hypochlorous acid in the reaction zone should be sufficient to provide from about 0.05 to about 10 grams per liter of available chlorine, and preferably from about 0.1 to about 5 grams per liter available chlorine. As used herein, the term "available chlorine" means the chlorine available to react with the vinyl chloride monomer absorbed by the hypochlorous acid solution and may be determined by standard methods, such as by adding excess potassium iodide to an acidified sample of hypochlorous acid solution and titrating the iodine formed with standard $Na_2S_2O_3$ solution. Of course, since the amount of available chlorine contained in the body of an aqueous absorbing solution in the reaction zone will vary from point to point in the reaction zone due, as for example, to the higher concentrations of vinyl chloride at the point of the introduction of the vinyl chloride gas to the reaction zone, the above ranges of available chlorine refer to the average concentrations in a given reaction zone.

For most efficient absorption and reaction of vinyl chloride in accordance with the present invention, it is preferred that the aqueous hypochlorous acid solution in the reaction zone have a pH within the range of from greater than about 0 to about 4, and preferably in the range of from about 1 to about 3. It has been discovered that a pH of greater than about 4 greatly decreases the efficiency of the liquid absorption medium to remove the vinyl chloride from a gaseous stream sought to be treated. Moreover, the presence of sufficient free hydrogen ions in solution to yield a pH of zero is disadvantageous because the solubility of chlorine in such solutions is very low and the bulk of the chlorine would therefore pass through the reaction zone without reacting with the vinyl chloride in the gas stream.

The desired pH in the aqueous hypochlorous acid solution contained in the reaction zone may be maintained by known methods, such as by adding an alkaline reacting agent to the solution introduced to the reaction zone or to the solution contained in the reaction zone where necessary to raise the pH (which tends to be decreased during the course of the process due to reaction of hypochlorous acid with the absorbed vinyl chloride). Suitable alkaline reacting agents include members selected from the group consisting of alkali metal and alkaline earth metal hydroxides, carbonates, bicarbonates and mixtures thereof. Alternatively, the pH may be lowered when necessary by introducing a chlorine-containing gas into the aqueous hypochlorous acid solution either prior to or after the addition of the hypochlorous acid solution to the reaction zone.

The aqueous hypochlorous acid solution to be used in contacting the vinyl chloride gas may be prepared by any standard method, such as by sparging chlorine gas continuously, semi-continuously or batchwise into water, and the hypochlorous acid solution so produced may then be fed to the reaction zone for absorption of vinyl chloride. Spent hypochlorous acid solution, that is, aqueous absorbing solution which has become depleted of at least a portion of its hypochlorous acid content, due to reaction with absorbed vinyl chloride, may be withdrawn from the reaction zone and passed to a separate chlorine treatment zone wherein the spent solution is contacted with chlorine-containing gas for absorption of chlorine and consequent production of additional hypochlorous acid values in the solution. A portion of the hypochlorous acid solution so produced may be recycled to the reaction zone for absorption and reaction with additional vinyl chloride. Alternatively, as is preferred, the spent hypochlorous acid solution withdrawn from the reaction zone may be contacted with chlorine-containing gas as by passing the chlorine-containing gas directly into the portion of spent hypochlorous acid which is recycled to the reaction zone, thereby avoiding the need to employ a separate treatment vessel. Although the hypochlorous acid content of the withdrawn spent hypochlorous acid solution is not critical to the present invention, the spent hypochlorous acid solution withdrawn from the reaction zone will generally contain less than about 0.1 grams per liter available chlorine, and preferably less than about 0.05 grams per liter available chlorine. The amount of chlorine passed to the spent solution for production of additional hypochlorous acid will vary widely although chlorine is preferably passed to the vessel in an amount (1) which is on a molar basis, at least equal to the vinyl chloride in the gas stream being fed to the process and (2) which is sufficient to form a hypochlorous acid solution having from about 0.05 to about 10 grams per liter available chlorine, and preferably from about 0.1 to about 5 grams per liter available chlorine.

The vent gas exiting the process of the present invention will be substantially free of vinyl chloride, that is, the vinyl chloride concentrations in the vent gas will generally be less than about 10 ppm, and preferably less than about 5 ppm vinyl chloride, based on the volume of the vent gas stream. The vent gas may also contain minor amounts of hydrochloric acid (formed by hydrolysis of chlorine), chlorine and water-insoluble reaction products, in addition to water vapor and inerts, such as nitrogen.

The gas exiting the reaction zone is substantially free of vinyl chloride and may be vented to the atmosphere. Alternatively, the vent gas from the reaction zone may be first passed to a scrubbing zone for removal of those reaction by-products such as hydrogen chloride and 1,1,2-trichloroethane, which were not absorbed by the aqueous hypochlorous acid solution in the reaction zone and also for absorption of any chlorine gas which has not been absorbed and/or reacted in the reaction zone, thereby providing a final vent gas stream exiting the scrubbing zone which is also substantially free of such by-products. While any conventional gas scrubbing method may be employed, the vent gas exiting the reaction zone is preferably contacted in the scrubbing zone by an aqueous solution containing an alkaline reacting agent. Suitable alkaline reacting agents includes members selected from the group consisting of alkali metal and alkali earth metal hydroxides, carbonates, bicarbonates and mixtures thereof, with sodium hydroxide being preferred. The final vent gas exiting the scrubbing zone may be vented to the atmosphere. Alternatively, when the final vent gas contains undesired quantities of water-insoluble reaction products such as 1,1,2-trichloroethane which were formed in the reaction zone, the final vent gas may be passed from the scrubber to a conventional condenser for removal of such water-insoluble components of the final vent gas before passing the gas to the atmosphere.

The absorption and reaction of vinyl chloride in the reaction zone by contact with an aqueous solution of hypochlorous acid may be effected employing any of the apparatus that are typically employed to provide absorbing contact between liquids and gases. Thus, the absorption of the vinyl chloride may be effected in one or more absorption stages in one or more vessels. Preferably, however, the process of the present invention is practiced employing a countercurrent absorption tower having at least one, and more preferably at least two, packed sections.

Reference is made to FIG. 1 wherein one embodiment of the process of the present invention is illustrated. In the apparatus of FIG. 1, a gas stream containing vinyl chloride (e.g., 5 volume percent vinyl chloride) passes into absorption column 4, via line 3 and upwardly there-through in contact with aqueous hypochlorous acid in the reaction zone which comprises, in part, lower packed section 6 and upper packed section 8. Each packed section is provided with a suitable packing, e.g., ¾ inch Raschig rings, and is supported by a perforated bed plate, plate 9 supporting packing in section 6, and plate 7 supporting packing in section 8. An aqueous hypochlorous acid solution (e.g., containing 5 grams per liter available chlorine) is fed via line 12 to column 4 at a point above upper packed section 8, and flows downwardly through the column and over the packings in packed sections 6 and 8, providing countercurrent gas/liquid contact with the upwardly flowing gas containing vinyl chloride.

Operation of column 4 results in a downflow of liquid which accumulates as spent hypochlorous acid solution in reservoir 10 at the base of column 4. Spent solution is withdrawn from reservoir 10 via line 16, either intermittently, semi-continuously or continuously, and with addition of make-up water via line 11, passed to line 12 for recycle to column 4. A portion of spent hypochlorous acid solution is purged from line 16 as via line 17 to prevent build-up of water-soluble impurities in the system. A chlorine-containing gas is introduced, in an intermittent, semi-continuous, or continuous manner, to line 16 via line 14, for absorption of chlorine and formation of additional hypochlorous acid values in the solution passed to line 12 for recycle to the column.

The vent gas exiting column 4 via line 20, which may comprise gaseous reaction products not soluble in water, inerts and some chlorine and acidic materials such as HCl, is passed to scrubber 30, wherein the vent gas is contacted with an aqueous solution containing an alkaline reacting agent (e.g. sodium hydroxide) for removal of chlorine and acidic materials such as HCl. The remaining materials, mostly nitrogen, are vented to the atmosphere via line 18.

In the process illustrated in FIG. 1, scrubber 30 comprises a countercurrent absorption column having a single packed section 32. The aqueous scrubbing solution is introduced to scrubber 30 via line 34 at a point in the column above packed section 32. Liquid accumulating in reservoir 31 at the base of scrubber 30 is recycled via line 34, with addition of make-up scrubbing solution via line 36, to the top of scrubber 30. A purge stream may be withdrawn from reservoir 31 via line 33 to avoid build-up in scrubber 30 of impurities (e.g., dissolved alkali metal and/or alkali earth metal salts of the alkaline reacting agent used, and water-soluble reaction products such as chlorine-containing hydrocarbons). A side stream may be withdrawn via line 15 from the recycled scrubbing solution in line 34 and passed to line 12 as needed to raise the pH of the recycled hypochlorous acid solution passed to column 4.

Figure 2:
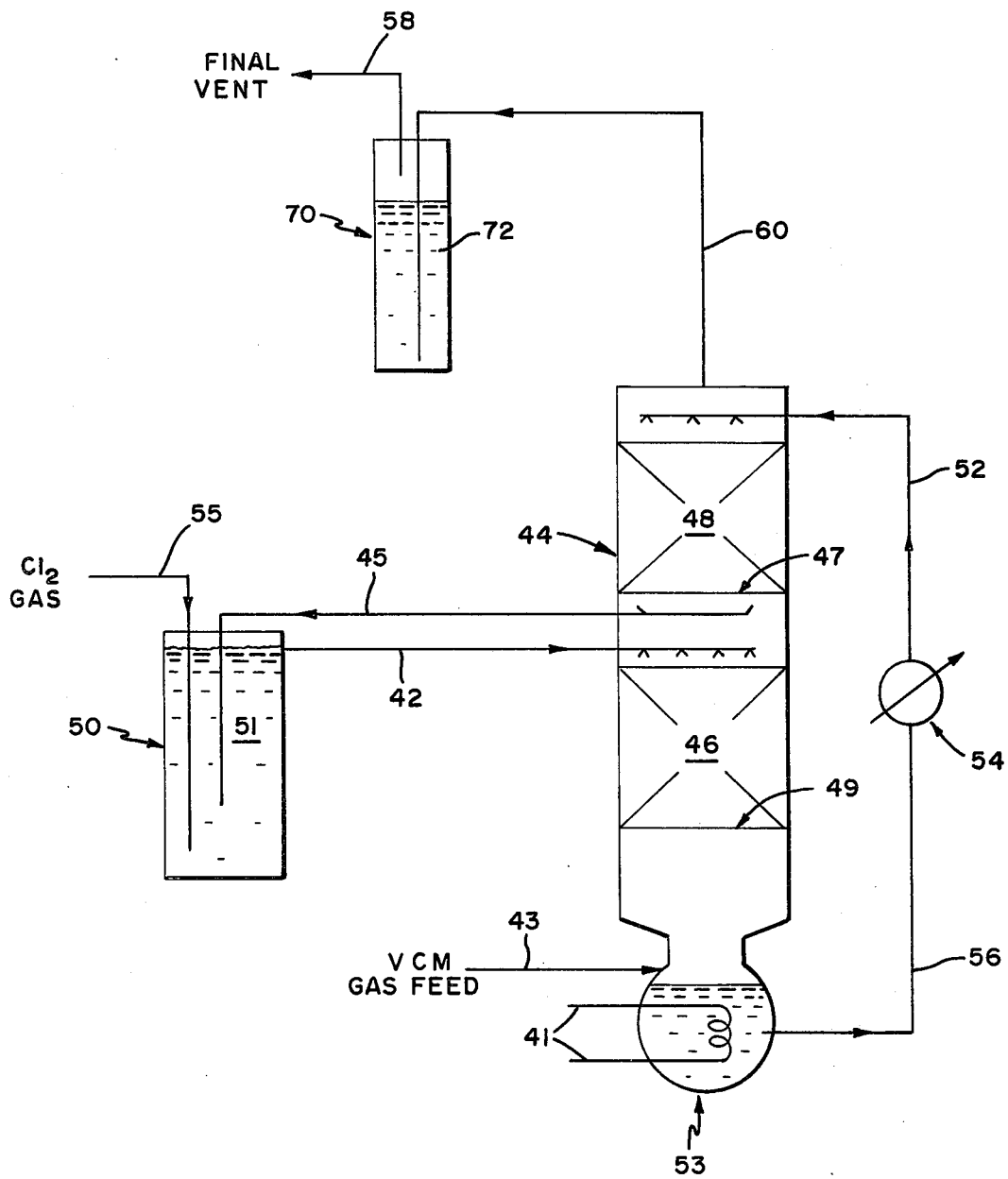
FIG. 2 is a diagrammatic illustration of a second embodiment of the process of the present invention.

FIG. 2 illustrates a second embodiment of the process of the present invention wherein a gas stream containing vinyl chloride monomer (e.g., 2 volume percent vinyl chloride) passes via line 43 into absorption column 44, in which is provided lower packed section 46 and upper packed section 48, each packed with ¼ inch Raschig rings and supported by a packing bed plate (bed plate 49 supporting the packing in lower packed section 46; and bed plate 47 supporting the packing in upper packed section 48). Aqueous hypochlorous acid solution is fed via line 42 to column 44 at a point above lower packed section 46 so as to flow downwardly over the packing contained therein. The hypochlorous acid solution fed to column 44 is produced by sparging a chlorine-containing gas, either batchwise, semicontinuously or continuously, via line 55 into aqueous medium 51 contained in vessel 50.

Spent absorption solution depleted of hypochlorous acid values is recovered from column 44 at a point in the column below bed packing plate 47, i.e. at a point beneath the upper packed section 48 and is passed to vessel 50 for contact with a chlorine-containing gas.

The gas containing vinyl chloride passes upwardly through column 44 in contact with the aqueous hypochlorous acid solution contained in lower packed section 46, wherein at least a portion of the vinyl chloride content thereof is absorbed. The gases passing from lower packed section 46 which may contain unabsorbed vinyl chloride, pass upwardly through upper packed section 48 in contact with an aqueous hypochlorous acid solution recycled to this section via line 52. The gaseous reaction products which are not water-soluble, together with inert gases, exit from column 44 via line 60 and are passed to vessel 70 wherein the gases are contacted with an aqueous solution containing an alkaline reacting agent (e.g., sodium hydroxide) for removal of traces of chlorine and acidic materials such as HCl. The remaining inert materials, mostly nitrogen, are vented to the atmosphere via line 58.

Operation of column 44 results in a downflow of liquid which accumulates in reservoir 53 at the base of column 44. This liquid may be heated as by means of heating element 41, e.g. up to the boiling point of the liquid contained in reservoir 53, to cause a portion of the available chlorine in this solution to be evolved as chlorine gas, which then passes upwardly through the column to be reabsorbed therein, thereby increasing the hypochlorous acid content of the liquid in lower packed section 46 and supplementing the available chlorine therein. The liquid in reservoir 53 is withdrawn from column 44 either intermittently, semi-continuously or continuously and passed via line 56 to cooling zone 54 wherein the temperature of the recycled liquid is lowered to within the range of about 10° to 90° C. The cooled liquid is then introduced to column 44 as discussed above. Liquid containing water-soluble reaction products may be purged from the system at any of several points, such as from reservoir 53 at the base of column 44 or from the aqueous recycle stream before or after cooling zone 54.

The process of the present invention is further illustrated by the following examples wherein parts are by weight unless otherwise indicated.

EXAMPLE 1

Experiments are performed in a tall reaction flask containing about 2 liters of hypochlorous acid solution, which flask is fitted with two fritted glass spargers, one for chlorine addition and a second for vinyl chloride-air mixtures. The exit gas is directed to a 25 weight percent solution of sodium hydroxide which acts as a scrubber to remove any chlorine or acidic material in the gas. Unabsorbed gases are then passed through a sample bulb before being vented to the atmosphere. The vinyl chloride-air mixture is prepared from metered flows of vinyl chloride and air to yield a mixture containing approximately 0.01 volume percent vinyl chloride. A part of the mixture is then passed through another flow meter to a gas sample bulb and is then sparged at a rate of 200 cc/min. to a hypochlorous acid scrubber, which comprises a vessel containing an absorbing solution of hypochlorous acid solution prepared by sparging chlorine gas to water in the vessel. Chlorine is intermittently sparged to the absorbing solution during a given run for pH control and to maintain the hypochlorous acid concentration in the scrubber. A given run lasts from 1 to 5 hours and the same hypochlorous acid solution is used for all eight runs. The pH of the hypochlorous acid solution is increased by adding caustic solution to the solution and lowered by chlorine addition. The gas in each sample bulb is analyzed by gas chromatography. The results obtained in runs 1 through 8 are summarized in Table I below:

TABLE I

| Run No. | Conditions-HOCl Scrubber | | VCM Concentration | |
|---|---|---|---|---|
| | pH | GMS/Liter Cl$_2$ | Inlet -Vol.%- | Outlet |
| 1 | 2.5 | 3.83 | 0.011 | <0.0002[1] |
| 2 | 2.5 | 3.22 | 0.013 | <0.0002[1] |
| 3 | 4.0 | 5.14 | 0.0125 | 0.0005 |
| 4 | 3.9 | 5.21 | 0.0125 | 0.0008 |
| 5 | 2.9 | 5.10 | 0.0076 | <0.0002[1] |
| 6 | 2.8 | 5.40 | 0.0136 | <0.0002[1] |
| 7 | 3.2 | 4.30 | 0.0112 | <0.0002[1] |
| 8 | 5.2 | 4.50 | 0.013 | 0.0038 |

[1]The minimum detectable vinyl chloride concentration in the test is 2 ppm.

EXAMPLE 2

Employing a countercurrent absorption column substantially as shown in FIG. 2, a vinyl chloride-air mixture prepared as in Example 1 is introduced to the column (4.5 feet high, 2 inches in diameter at the rate of 260 cc/min. and passes upwardly through the lower packed section (2 feet high; 1.25 feet packed height) packed with ¼ inch Raschig rings and containing about 0.5 liter of a hypochlorous acid solution, having a pH of 2.2 and containing about 0.45 gram of available chlorine gas per liter of solution. Gas exiting the lower packed section passes upwardly in the column through the upper packed section (2.75 feet high; 2 feet packed height) also packed with ¼ inch Raschig rings and containing about 0.75 grams of available chlorine per liter of hypochlorous acid solution. The latter solution is introduced to the upper reaction zone as recycle from the reservoir at the base of the column. Heated solution is withdrawn from the reservoir and introduced to the upper packed section after being cooled in a cooling apparatus to a temperature of 18° C. The gases exiting the upper packed section are passed to a caustic scrubber. A sample bulb is placed in the vinyl chloride-air feed, and another such bulb is placed after the caustic scrubber. The results indicate that removal of vinyl chloride is substantially complete at a pH of 2.2 and with only from 0.46 to 0.76 grams of available chlorine per liter of solution in the upper packed section. The results are summarized below in Table II:

TABLE II

| Conditions-HOCl Scrubber in Upper Packed Section | | VCM Concentration | |
|---|---|---|---|
| pH | gms/Liter Cl$_2$ | Inlet -Vol.% VCM- | Outlet |
| 2.2 | 0.46–0.76 | 0.011 | < 0.0002[1] |

[1]The minimum detectable vinyl chloride concentration is 2 ppm.

The gas vent exiting the apparatus is also found to contain about 14 volume percent carbon dioxide, about 86 volume percent water vapor and about 0.4 volume percent unknowns, calculated on an air-free basis.

EXAMPLE 3

The procedure of Example 2 is repeated with the gaseous vinyl chloride-air mixture being passed through the apparatus for 15 hours to accumulate product of reaction between the hypochlorous acid vinyl chloride. Samples of aqueous phase are then drawn from the bottom of the column and extracted with carbon disulfide. The carbon disulfide extract is analyzed by gas chromatography and fractions from the gas chromatograph column are collected and examined by infrared spectroscopy. The samples are shown by gas chromatography to contain about 95.3% 1,1,2-trichloroethane (boiling point approximately 112° C), with the remainder comprising unknown impurities. The presence of 1,1,2-trichloroethane is confirmed by infrared analysis.

While we have in the foregoing described in some detail the preferred embodiment of our invention and some variations thereof, it will be understood that this is only for the purpose of making the invention more clear and that the invention is not to be regarded as limited to the details of operation, nor is it dependent on the soundness or accuracy of the reasons advanced for the advantageous results obtained.

We claim:

1. A process for removing vinyl chloride from a gas stream containing the same which comprises contacting said gas stream in a reaction zone with an aqueous medium containing hypochlorous acid.

2. The process according to claim 1 wherein said aqueous medium contains hypochlorous acid in amount corresponding to from about 0.05 to about 10 grams per liter available chlorine.

3. The process according to claim 2 wherein said aqueous medium has a pH within the range of from greater than about 0 to about 4.

4. The process according to claim 1 wherein spent hypochlorous acid solution is withdrawn from the reaction zone and passed to a chlorine treatment zone wherein said spent solution is contacted with a chlorine-containing gas for absorption of at least a portion of the chlorine from said gas, thereby producing an aqueous solution containing additional hypochlorous acid values, and recycling the solution so produced to the reaction zone.

5. The process according to claim 4 wherein the spent hypochlorous acid solution withdrawn from the reaction zone contains less than about 0.1 gram per liter available chlorine.

6. The process according to claim 1 wherein the gas stream passed to the reaction zone contains from about 0.0001 to about 10 volume percent vinyl chloride, based on the volume of the gas stream.

7. The process according to claim 1 wherein the gas exiting the reaction zone contains less than about 10 ppm vinyl chloride.

8. The process according to claim 1 wherein gas exiting the reaction zone is passed to a scrubbing zone wherein the exit gas is contacted with an aqueous scrubbing solution containing an alkaline reacting agent.

9. The process according to claim 8 wherein the alkaline reacting agent is selected from the group consisting of alkali metal and alkali earth metal hydroxides, carbonates, bicarbonates and mixtures thereof.

* * * * *